(12) United States Patent
Fenn

(10) Patent No.: US 6,283,145 B1
(45) Date of Patent: Sep. 4, 2001

(54) PROPORTIONAL CONTROL GAS VALVE

(75) Inventor: Gordon Fenn, San Clemente, CA (US)

(73) Assignee: Cybertech Ventures, Inc., San Clemente, CA (US)

( * ) Notice: Subject to any disclaimer, the term of this patent is extended or adjusted under 35 U.S.C. 154(b) by 0 days.

(21) Appl. No.: 09/496,660

(22) Filed: Feb. 3, 2000

(51) Int. Cl.$^7$ .................................................. G05D 7/06
(52) U.S. Cl. ............................................................. 137/489
(58) Field of Search ................................ 137/487.5, 489

(56) References Cited

U.S. PATENT DOCUMENTS

| | | | |
|---|---|---|---|
| 5,345,963 | * 9/1994 | Dietiker | 137/489 X |
| 5,413,141 | * 5/1995 | Dietiker | 137/489 |
| 5,435,343 | * 7/1995 | Buezis | 137/489 |

* cited by examiner

Primary Examiner—Gerald A. Michalsky
(74) Attorney, Agent, or Firm—A & J

(57) ABSTRACT

A proportional control gas valve includes a valve body formed with an inlet having a first orifice, a first chamber communication with the inlet through the orifice, a second chamber formed with a balancing orifice and a second orifice, a third chamber in communication with the first chamber through the balancing orifice, a fourth chamber in communication with the first chamber via the second orifice, a fifth chamber in communication with the fourth chamber, and an outlet in communication with the fifth chamber, a solenoid assembly mounted in the first chamber for controlling gas flowing from the first chamber to the fourth chamber via the second orifice, a main diaphragm arranged between the inlet and the third chamber, a valve spring mounted under the main diaphragm and urging the main diaphragm to move upwardly to close a passage from the inlet to the outlet, a regulation diaphragm mounted inside the fifth chamber, a regulation spring mounted on the regulation diaphragm, an adjust stem connected with the regulation diaphragm for controlling gas flow rate from the fourth chamber to the outlet, and a servomotor drivingly connected with the adjust stem, whereby the proportional control gas valve only requires a small amount of energy to control the gas pressure and flow rate simultaneously.

5 Claims, 4 Drawing Sheets

PROPORTIONAL CONTROL GAS VALVE

BACKGROUND OF THE INVENTION

1. Field of the Invention

This invention is related to a proportional control gas valve that is capable of linearly controlling a relatively large range of gas flow while utilizing a very small amount of energy. Furthermore, it has a fail-safe mode of operation.

2. Description of the Prior Art

One of the conventional ways to control the flow rate of gas fuel is accomplished by having a number of gas buners present within a heating apparatus. When little heat is required, only some of those gas burners will operate. As more heat is required, more gas burners will operate with the apparatus. Another conventional way to control the flow rate of gas fuel within a heating apparatus is to use several solenoid gas valves within a burner to control the flow rate of gas fuel. As more heat is needed, more of the valves within a burner commence operation within the heating apparatus.

However, while the result of having many gas burners operate simultaneously is an increase in heat output, the operation of many burners also results in increased cost, and makes it impossible to control gas flow linearly. Likewise, having a number of solenoid gas valves operate within a burner increases the costs of heating as more gas valves are required, and also cannot regulate gas flow linearly.

The costs of operating a conventional heating apparatus through the use of gas burners have generally been high because each of the burners require a gas solenoid valve for operation control. The conventional gas solenoid valve must be controlled manually, through the use of a switch or the like to control gas flow. However, by this method, gas flow cannot be controlled linearly.

Because the conventional gas solenoid valve is mable to control a large range of gas fuel flow rate, the typical heating apparatus, using the conventional gas solenoid valve, has a choice of flow rate from between one (1) to five (5) minimum heat to m heat range settings. This is a limited range of heat settings, reflecting the inability of the conventional gas solenoid valve to regulate a large range of gas fuel flow.

The small range of gas fuel flow provided by the gas solenoid valve has a number of disadvantages. One disadvantage is that the gas solenoid valve cannot meet the needs of heat users requiring heat at a precise temperature. Another disadvantage is that the small gas fuel flow range can waste energy, as heat users may be forced to utilize a higher heat setting than required because of the limited range of heat settings provided through the use of the conventional gas solenoid valve.

Furthermore, the conventional gas solenoid valve is very complicated in structure and requires a considerable amount of energy for operation. The conventional gas solenoid valve generally includes a magnetic circuit formed with a fixed iron core, magnets and a magnetic member. A coil holder is movably provided with respect to the outer periphery of the fixed iron core and has a magnetic coil wound around itself A sleeve is accommodated within the magnets and ed apart from the outer periphery of the fixed iron core for a determined distance. An actuating portion is formed with the fixed iron core. Therefore, it can be seen that the conventional gas solenoid valve is complex in structure.

Furthermore, should the fire igniting the gas fuel within a heating apparatus stop of its own accord, without being manually turned off, the conventional gas solenoid valve is not equipped to halt the gas fuel flow. Thus the gas fuel will flow at the rate set by the manual switch heat range setting, until the heating apparatus is manually switched off This is a potentially very dangerous situation.

Thus, it is an object of the present invention to provide an improved proportional control gas valve which can obviate and initiate the above-mentioned drawbacks.

SUMMARY OF THE INVENTION

This invention is related to a proportional control gas valve that is capable of linearly controlling a relatively large range of gas flow while utilizing a very small amount of energy and has a fail-safe mode of operation.

According to a preferred embodiment of the present invention, a proportional control gas valve includes a valve body formed with an inlet having a first orifice, a first chamber communications with the inlet through the orifice, a second chamber formed with a balancing orifice and a second orifice, a third chamber in communication with the first chamber through the balancing orifice, a fourth chamber in communication with the first chamber via the second orifice, a fifth chamber in communication with the fourth chamber, and an outlet in communication with the fifth chamber, a solenoid assembly mounted in the first chamber for controlling gas flowing from the first chamber to the fourth chamber via the second orifice, a main diaphragm arranged between the inlet and the third chamber, a valve spring mounted under the main diaphragm and urging the main diaphragm to move upwardly to close a passage from the inlet to the outlet, a regulation diaphragm mounted inside the fifth chamber, a regulation spring mounted on the regulation diaphragm, an adjust stem connected with the regulation diaphragm for controlling gas flow rate from the four it chamber to the outlet, and a servomotor drivingly connected with the adjust stern, whereby the proportional control gas valve only requires a small amount of energy to control the gas pressure and flow rate simultaneously.

It is an object of the present invention to provide a proportional control gas valve which can control the gas pressure and flow rate simultaneously.

It is still another object of the present invention to provide a proportional control gas valve which can be accurately controlled by a servomotor through feedback means without hysteresis.

It is still another object of the present invention to provide a proportional control gas valve which can be linearly controlled.

It is still another object of the present invention to provide a proportional control gas valve which can be easily converted from a proportional valve to a regulation valve.

It is still another object of the present invention to provide a proportional control gas valve which can be controlled by fuzzy logic technique.

It is still another object of the present invention to provide a proportional control gas valve which is simple in construction and easy to manufacture.

It is still another object of the present invention to provide a proportional control gas valve which is facile to maintain.

The foregoing objects and summary provide only a brief introduction to the present invention. To fully appreciate these and other objects of the present invention as well as the invention itself, all of which will become apparent to those skilled in the art the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
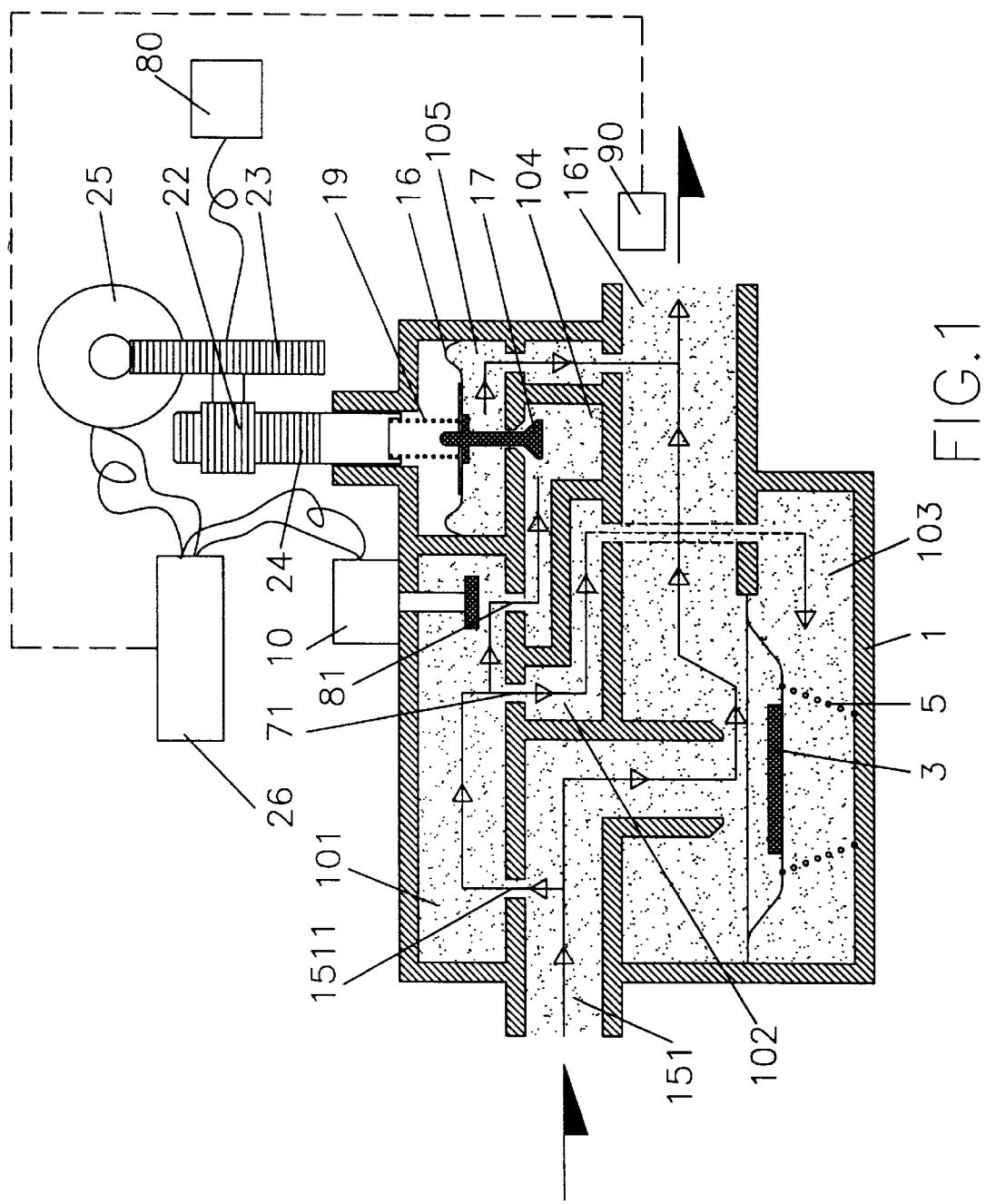
FIG. 1 is a schematic view illustrating the working principle of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and filer modifications in the illustrated device, and such further applications of the principles of the invention as illustrated herein being contaminated as would normally occur to one skilled in the art to which the invention relates.

Figure 2:
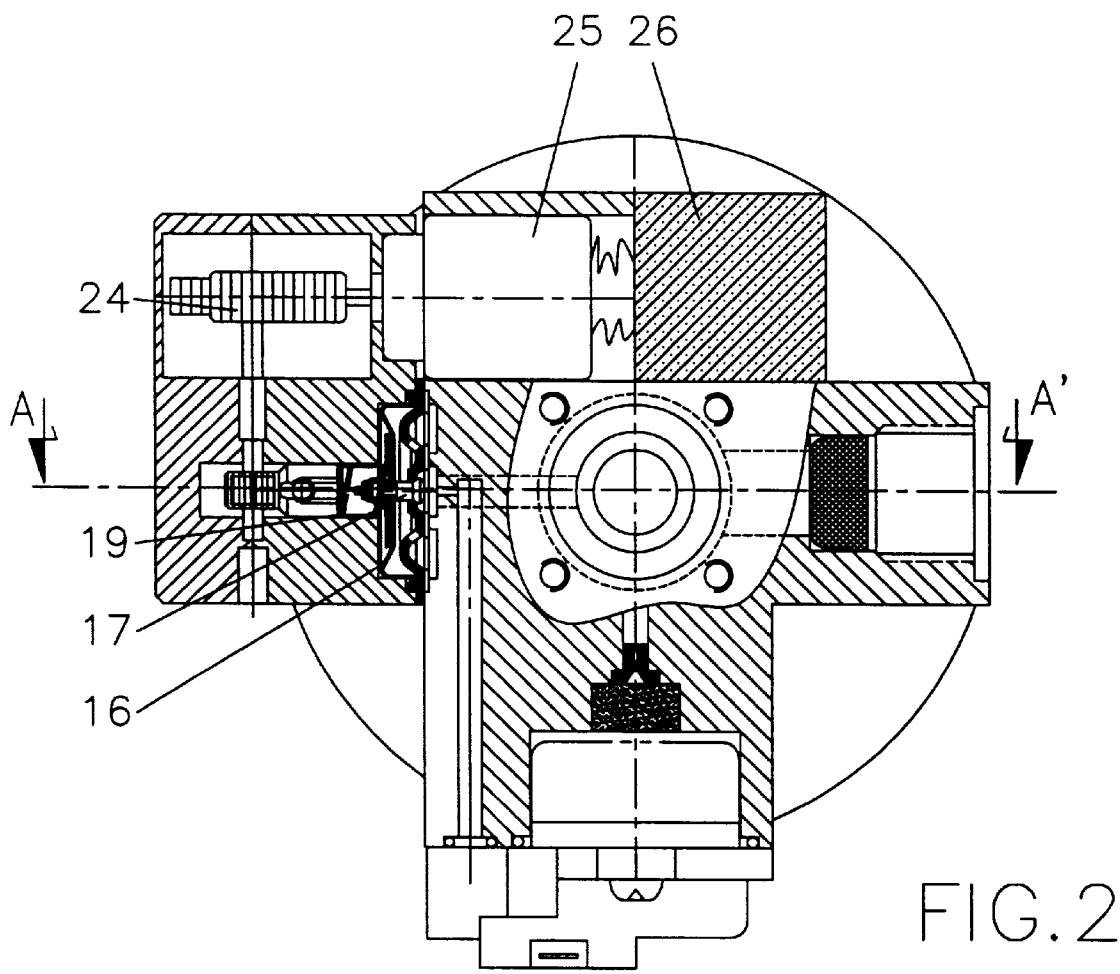
FIG. 2 is a cross sectional view of the present invention.
Figure 3:
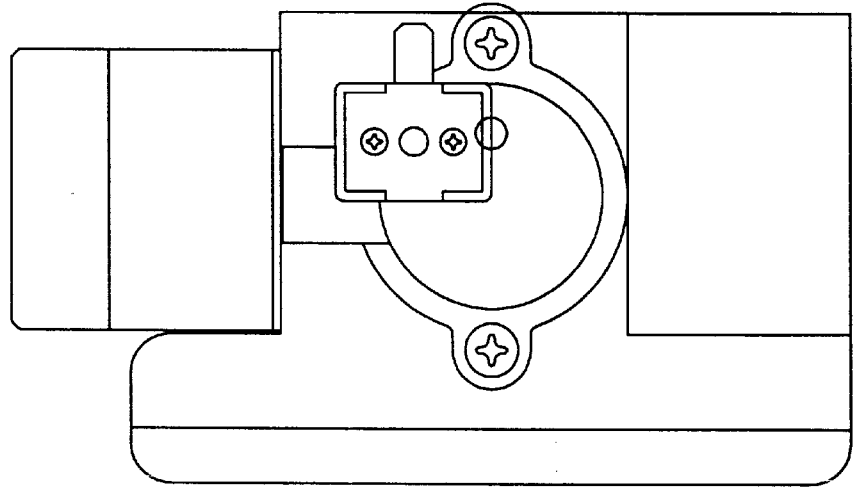
FIG. 3 is a top view of the present invention.
Figure 4:
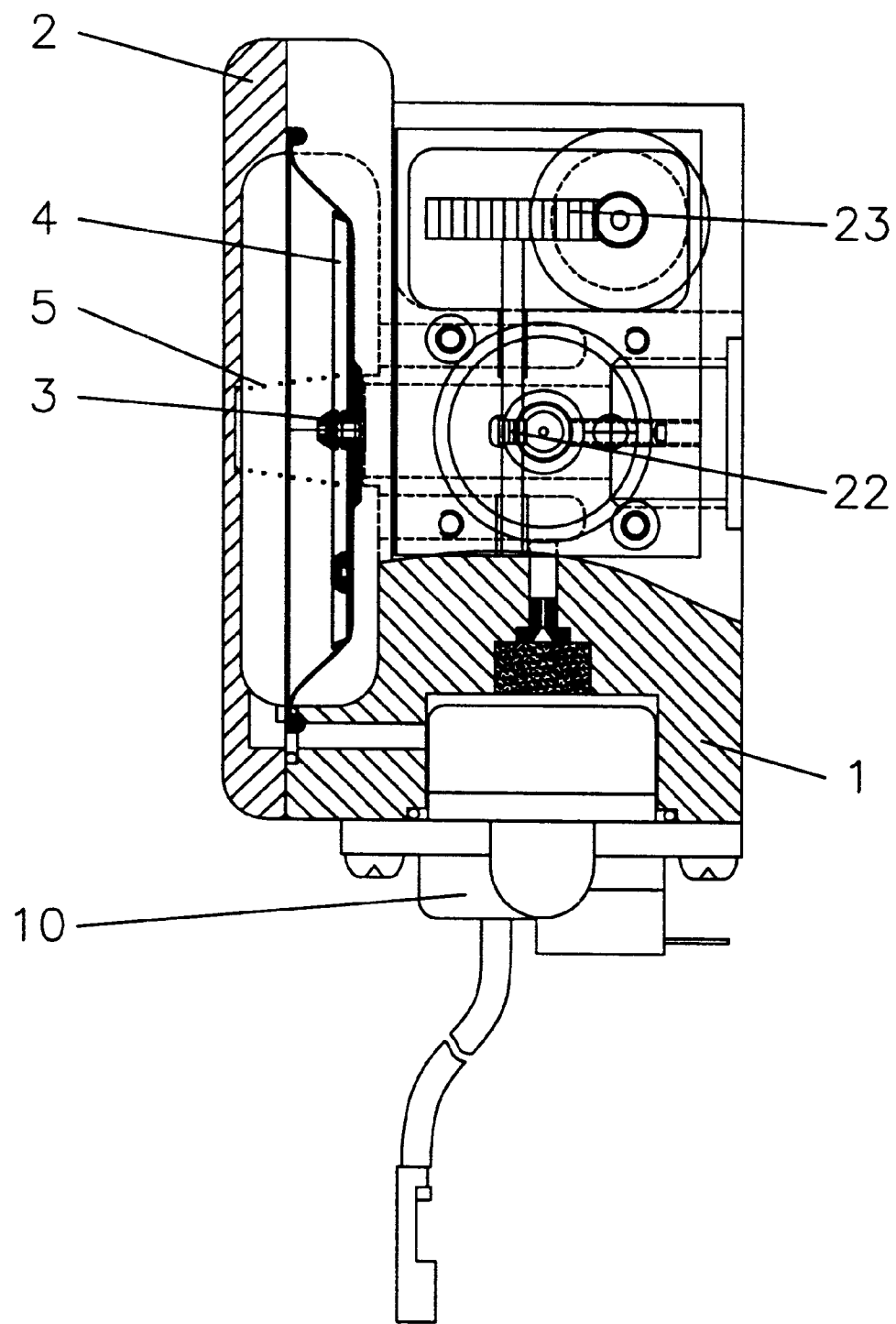
FIG. 4 is a longitudinal sectional view of the present invention.
Figure 5:
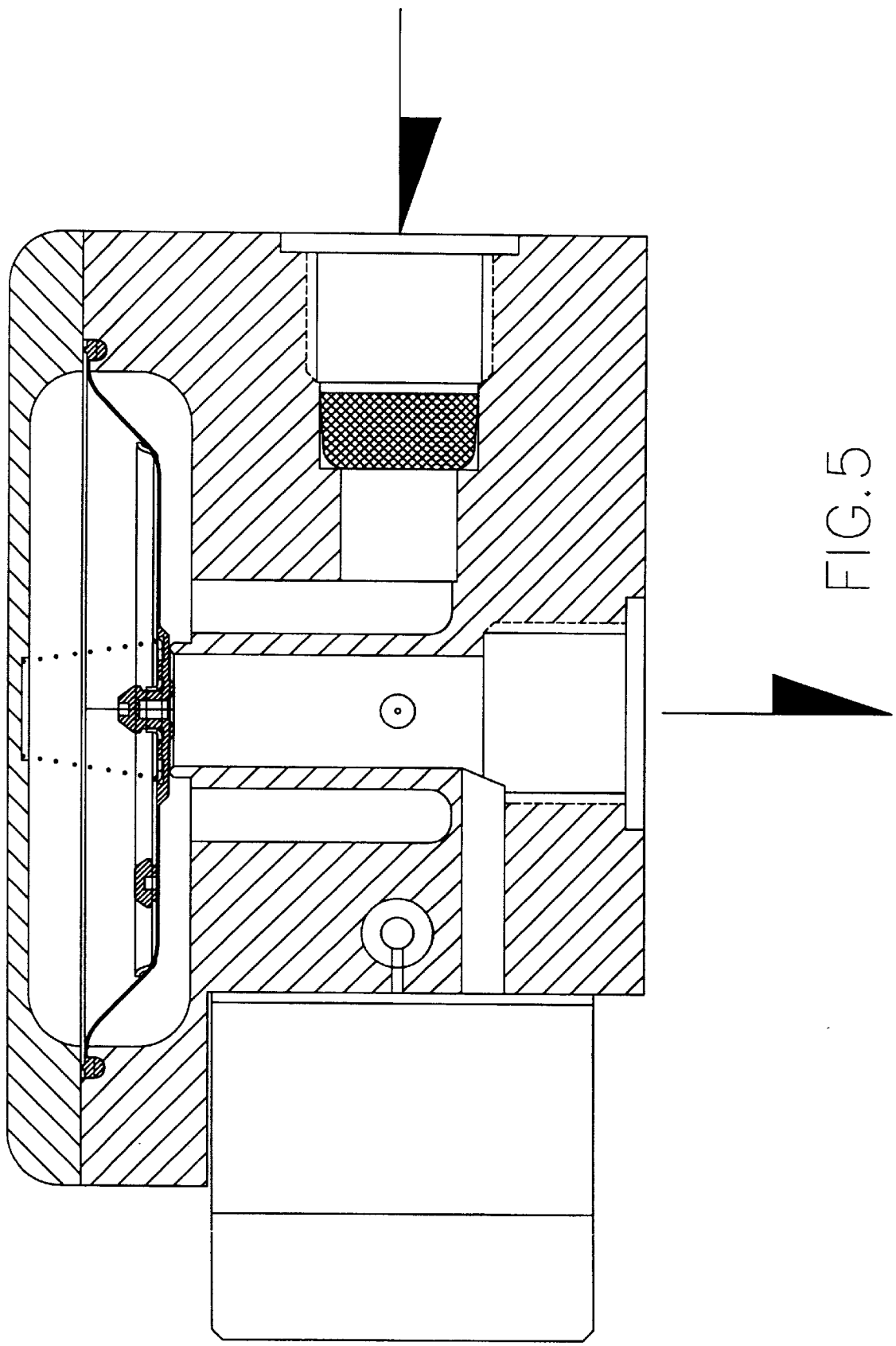
FIG. 5 is a sectional view taken along line A—A of FIG. 2.

With reference to FIGS. 1 through 5, the proportional control gas valve according to the present invention generally crises a valve body 1, a main diaphragm 3, a valve spring 5, a solenoid assembly 10, a regulation diaphragm 16, an adjust stem 17, a regulator spring 19, a fist gear 23, a second gear 24, and a servomotor 25. The valve body 1 is provided with a valve cover 2 at the bottom and formed with an inlet 151 at one end, an outlet 161 at another end, a first chamber 101, a second chamber 102, a third chamber 103, a fourth chamber 104 and a fifth chamber 105. The inlet 151 has an orifice 1511 in communication with the first chamber 101 which has a balancing orifice 71 and is provided with a solenoid assembly 10. An orifice 81 is formed between the first chamber 101 and the fourth chamber 104. The solenoid assembly 10 is used for controlling gas flowing out of the first chamber 101 into the fourth chamber 104. The balancing orifice 71 is in communication with the second chamber 102 which is in turn communicated with the third chamber 103. The main diaphragm 3 is provided at the bottom side with a diaphragm plate 4 and arranged between the outlet 151 and the third chamber 103 and urged by the valve spring 5 to go upwardly against the passage between the inlet 151 and the third passage 103. The secondary diaphragm 16 is arranged win the fifth chamber 105 and urged by a regulator spring 19 to move away from a motor screw 24. The secondary diaphragm 16 is provided with a valve element 17 which is installed between the fourth chamber 104 and the fifth chamber 105. The fifth chamber 105 is in communication with the outlet 161. The servomotor 25 is provided with a crank (not shown) which can be rotated with respect to the servomotor 25. The servomotor may be of any conventional design well known to the art and is not considered a part of the invention.

When the solenoid assembly is moved downwardly to close the orifice 81, the gas pressure applied to both sides of the main diaphragm 3 are equal and the main diaphragm 3 will be kept closed so that no gas will be able to flow through the gas valve according to the present invention.

When the solenoid assembly 10 is moved upwardly to open the orifice 81, the gas will first flow through the orifice 1511 into the first chamber 101 and then will be divided into two branch streams which will flow through the balancing orifice 71 and the orifice 81 into the second chamber 102 and the fourth chamber 104 respectively Thereafter, one of the two branch streams will flow into the third chamber 103 to apply pressure on the bottom of the main diaphragm 3. However, as the main gas flow from the inlet 151 is divided into two branch streams, the pressure of each of the two branch streams will be lower than that the main gas flow so that the main diaphragm 3 will be pushed open by the main gas flow thereby enabling the main gas flow to go to the outlet 161. As soon as the main diaphragm 3 is opened, the outlet pressure will be sensed by the regulation diaphragm 16 via a feedback potentiometer 80 or a pressure sensor 90 at the outlet 161. In the meantime, the other branch stream will flow through the adjust stem 17 which is controlled by the regulator sprig 19. The servomotor 25 is drivingly connected to the gear 23 which is meshed with the gear 22 which is in turn connected with a motor screw 24 arranged on the top of the regulator spring 19, so that when the servomotor 25 is turned on, the gears 22 and 23 will be rotated to drive the adjust screw 20 to change the tension of the regulator spring 19 thereby accomplishing the purpose of controlling the pressure and flow rate of the gas flowing out of the outlet 161. The servomotor 25 is controlled by the controller 26 which compares the outlet pressure with a preset value so that when the outlet pressure is not equal to the preset pressure, the servomotor 25 will be driven to adjust the position of the adjust stem 17 thereby maintaining a constant outlet pressure regardless of inlet pressure variations. When the outlet press=re is equal to the preset pressure, the power supplied to the servomotor 25 will be cut off thus saving the power required for the operation of the gas valve. The controller 26 is well known to those having ordinary skill in the art and will not be described here in detail.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the preset invention.

I claim:

1. A proportional control gas valve comprising:

a valve body formed with an inlet having a first orifice, a first chamber communication with said inlet through said orifice, a second chamber formed with a balancing orifice and a second orifice, a third chamber in communication with said first chamber through said balancing orifice, a fourth chamber in communication with said fist chamber via said second orifice, a fifth chamber in communication with said fourth chamber, and an outlet in communication with said fifth chamber;

a solenoid assembly mounted in said first chamber for controlling gas flowing from said first chamber to said fourth chamber via said second orifice;

a main diaphragm arranged between said inlet and said third chamber;

a valve spring mounted under said main diaphragm and urging said main diaphragm to move upwardly to close a passage from said inlet to said outlet;

a regulation diaphragm mounted inside said fifth chamber;

a regulation spring mounted on said regulation diaphragm;

an adjust stem connected with said regulation diaphragm for controlling gas flow rate from said fourth chamber to said outlet; and a servomotor drivingly connected with said adjust stem.

2. The proportional control gas valve as claimed in claim 1, further comprising a controller for controlling said servomotor.

3. The proportional control gas valve as claimed in claim 1, wherein said servomotor is drivingly connected with an adjust screw which urges against a top of a regulator spring.

4. The proportional control gas valve as claimed in claim 1, wherein said solenoid assembly is configured to be able to close or open said second orifice.

5. The proportional control gas valve as claimed in claim 2, wherein said controller compares outlet pressure with a preset value so that when said outlet pressure is not equal to said preset pressure, said servomotor will be driven to adjust position of said adjust stem so as to maintain a constant outlet pressure regardless of inlet pressure variations.

* * * * *